April 3, 1962 J. R. WICKLAND Re. 25,152

SHEET FEEDING APPARATUS

Original Filed Nov. 22, 1955 3 Sheets-Sheet 1

INVENTOR.
JOSEPH R. WICKLAND

BY

Bauer and Seymour
ATTORNEYS

April 3, 1962 J. R. WICKLAND Re. 25,152

SHEET FEEDING APPARATUS

Original Filed Nov. 22, 1955 3 Sheets-Sheet 2

INVENTOR.
JOSEPH R. WICKLAND

BY

Bauer and Seymour
ATTORNEYS

SHEET FEEDING APPARATUS

Original Filed Nov. 22, 1955 3 Sheets-Sheet 3

INVENTOR.
JOSEPH R. WICKLAND

BY

Bauer and Seymour
ATTORNEYS

United States Patent Office

Re. 25,152
Reissued Apr. 3, 1962

25,152
SHEET FEEDING APPARATUS

Joseph R. Wickland, Pearl River, N.Y., assignor, by mesne assignments, to Miehle-Goss-Dexter, Incorporated, a corporation of Delaware Original No. 2,823,916, dated Feb. 18, 1958, Ser. No. 548,381, Nov. 22, 1955. Application for reissue Feb. 20, 1959, Ser. No. 795,305
14 Claims. (Cl. 271—30)

Matter enclosed in heavy brackets [ ] appears in the original patent but forms no part of this reissue specification; matter printed in italics indicates the additions made by reissue.

This invention relates generally to sheet feeding apparatus for feeding sheets from a pile or supply thereof to a printing press or other machine, and refers more particularly to the sheet separator mechanism of such apparatus by which the topmost sheets of a pile or supply of sheets are preliminarily separated in turn so that feeding of single sheets only to the machine to be fed is assured.

One of the objects of the present invention is to provide sheet feeding apparatus with an improved sheet separator mechanism of the suction type wherein the proper elevational operative position of the suction sheet engaging and lifting device with respect to the topmost sheet of the pile or supply thereof is maintained regardless of variations in the height or the level of the top of said pile or supply.

Another object of the invention resides in the provision of an improved sheet separator mechanism of the character above described wherein the extent of movement of the suction sheet engaging and lifting device toward the sheet pile or supply is automatically varied in accordance with the location of the top of said pile or supply, whereby proper engagement of said suction device with the topmost sheet and lifting of said sheet only by said suction device is always assured.

Another object is to eliminate, in a sheet separator mechanism of the character above described, the manual adjustment of the suction sheet engaging and lifting device heretofore required and necessary during the normal operation thereof to enable accurate engagement and lifting of the topmost sheet only thereby from the sheet pile or supply, and to accomplish said adjustment automatically under the control of said pile or supply.

Another object is to provide in a sheet feeder having means for preliminarily separating a portion of each topmost sheet in turn from a supply of sheets and suction or other means for gripping each sheet at the separated portion thereof and lifting said sheet from said supply, novel cyclically operable means for determining the location of the top of the supply and varying the extent of downward movement of the suction or other means accordingly so as to advantageously provide for engagement of said suction or other means with the sheet at substantially the level of the separated portion thereof.

Still another object is to provide for use in existing sheet feeders having a suction sheet lifting device movable downwardly toward and upwardly away from the top of a pile or supply of sheets, and a sheet holding foot clamp device movable downwardly and upwardly into and out of engagement, respectively, with the top of said pile or supply, novel means operated by said foot clamp device and controlled by said pile or supply for automatically controlling and determining the extent of downward movement of said suction sheet lifting device.

The above and further objects and novel features of the present invention will more fully appear from the following detailed description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a fragmentary rear elevational view of a sheet feeder embodying the present invention, certain of the parts having portions thereof broken away for purposes of clearer illustration;

FIG. 2 is an enlarged side elevational view, partly in section, of one of the sheet separator mechanisms shown in FIG. 1 and as viewed from the position indicated by the line 2—2 of FIG. 1, the cover plate for the housing of said mechanism being removed for purposes of clearer illustration, and said view showing in full lines the operative parts of said mechanism in the positions they occupy when the sheet holding foot clamp is engaged with the pile of sheets and the sheet lifting sucker is about to be lowered toward said pile;

For purposes of description only, the present invention is herein illustrated in a form particularly adapted for use in connection with known sheet separator mechanisms and sheet holding foot clamp mechanisms which are incorporated in existing types of sheet feeding machines. It is accordingly to be understood, even though the following specification refers to a specific type of sheet feeder and to a specific type of sheet separator mechanism and sheet holding foot clamp mechanism embodied in said feeder, that the present invention is not limited to said feeder or said mechanisms. Various changes may be made in the form of the invention illustrated to adapt the same to other sheet separator mechanisms having a suction or other type of sheet separating device movable toward and away from a pile or supply of sheets, and to provide for operation of the same under the control of the usual foot clamp or other feeler member which is periodically operated into and out of engagement with said sheet pile or supply the same as or comparable to said foot clamp.

Figure 1:
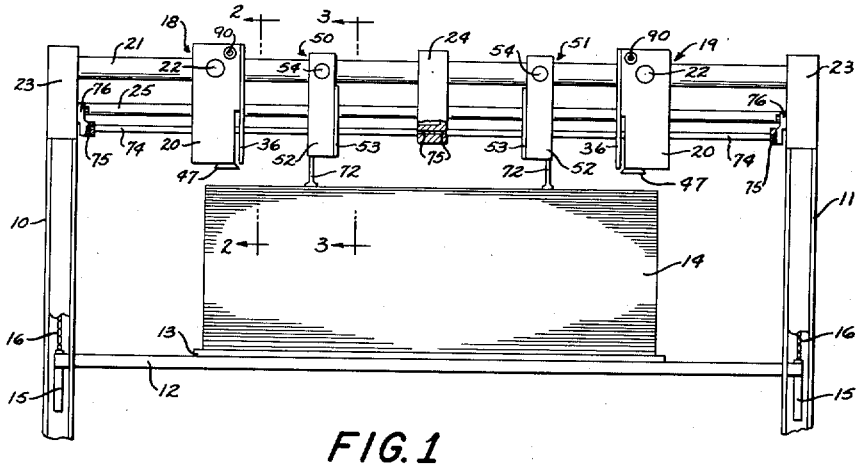

Referring to the drawings, 10 and 11 (FIG. 1) indicate, in rear elevation, the side frames of an existing sheet feeder which includes a pile elevator comprising front and rear cross beams 12 adapted to support a pile board 13 and pile of sheets 14 thereon. The cross beams 12 are supported by side bars 15 which are connected adjacent their front and rear ends to cables 16 that pass over suitable sheaves and around suitable winding drums (not shown). Since the pile elevator which carries the pile of sheets 14 is of well-known construction and operation, further description thereof is unnecessary except to say that as the sheets are fed off the top of the pile, the elevator is automatically raised step-by-step by the described drums to maintain the top of said pile at a predetermined level and thus insure continued and accurate separation and feeding of the sheets from the top of the pile.

Figure 4:
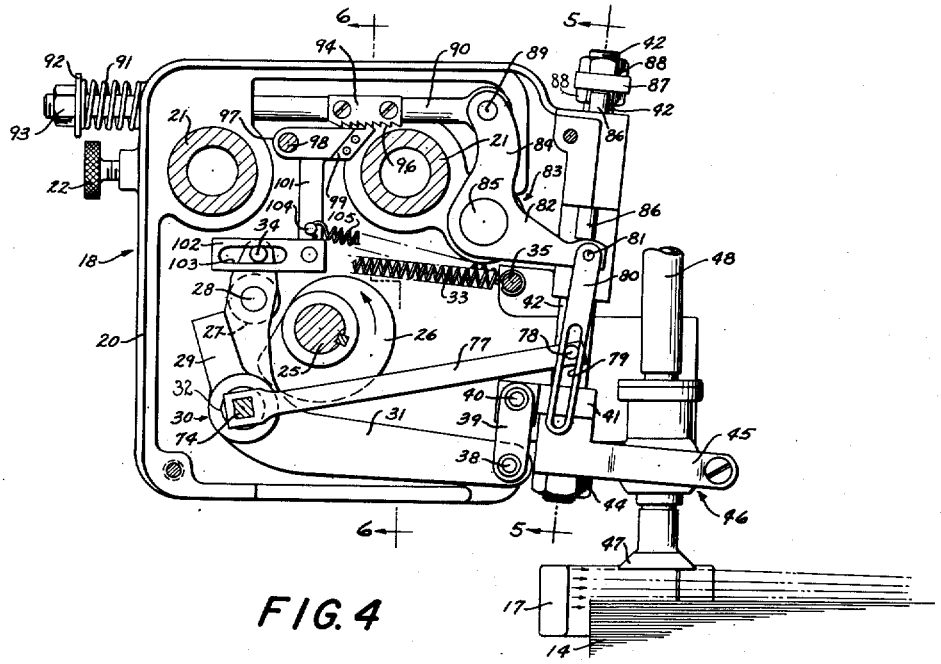
FIG. 4 is a view similar to FIG. 2, but showing the operative parts of the sheet separator mechanism in the positions they occupy when the sheet holding foot clamp is disengaged from the pile of sheets and the sheet lifting sucker has been lowered and is about to grip the topmost sheet of said pile, one of the springs having a portion thereof broken away for purposes of clearer illustration.
Figure 2:
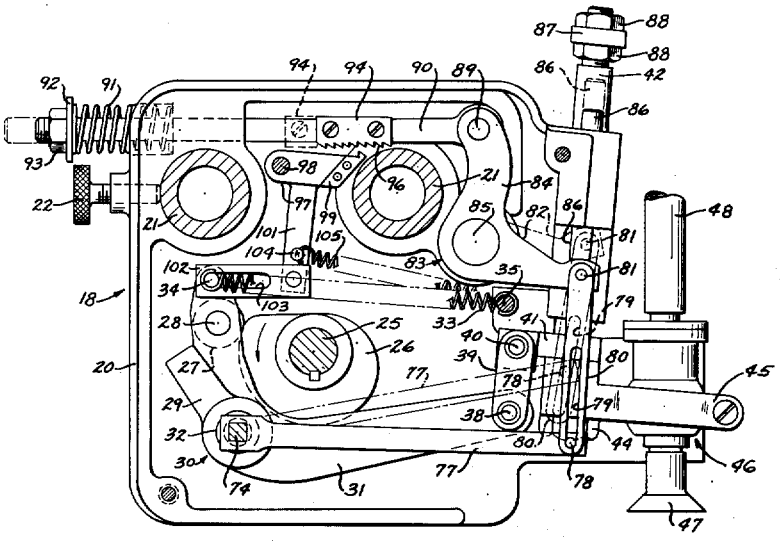

The sheets of pile 14 are lifted from said pile one after another at the rear opposite corners thereof by sheet lifting mechanisms to be later described, but before this operation takes place, the upper rear corner portions of the sheets are preliminarily separated to insure that the top sheet alone is lifted from the pile by said mechanisms. This preliminary separation of the sheets may be effected by any well-known means for this purpose, such as, for example, comber wheels, or as illustrated herein, corner air blast devices 17 (FIGS. 2 and 4) of substantially the same construction as those disclosed in the United States Patent No. 2,434,530, granted January 13, 1948, to Leo C. Williams, needing no detailed description herein, except to say that said air blast devices function to raise or "fluff-up" the opposite corner portions of the uppermost sheets, whereby said sheets become separated one from another in a progressive manner, with the maximum amount of separation being between the topmost sheet and the next or underlying sheet, as shown in FIGS. 2 and 4.

After preliminary separation of the uppermost sheets, and particularly the topmost sheet, has been effected at the rear opposite corner portions thereof, the topmost sheet is lifted from the top and rear of the pile 14 and thus further separated from said pile by sheet separator mechanisms of substantially the same construction and operation as those disclosed in the United States Patent No. 2,389,480, granted November 20, 1945, to Leonard Baker. These sheet separator mechanisms, indicated generally at 18 and 19 (FIG. 1), are constructed one left-hand and the other right-hand, and are each arranged at opposite sides of the feeder, and since the constructions of said mechanisms are otherwise identical, a description of one will suffice for both. For this purpose the left-hand sheet separator mechanism 18 has been chosen, and for the sake of simplicity and brevity in describing the present invention, only that portion of said sheet separator mechanism with which the present invention is actually concerned is herein illustrated and will be described, it being understood that the present invention is embodied in both sheet separator mechanisms 18 and 19.

As shown in FIGS. 2, 4, 5 and 6, each sheet separator mechanism comprises a housing 20 slidably mounted on a pair of tubular shafts 21 and secured by a clamp screw 22 to one of said shafts in various positions of adjustment along said shafts. Movement of the housings 20 along the shafts 21 provides for adjustment of the sheet separator mechanisms 18 and 19 independently of each other transversely of the feeder to accommodate sheets of different widths. The shafts 21 are suitably secured at their opposite ends in brackets 23 (FIG. 1) which are slidably mounted on the side frames 10 and 11 to enable adjustment of the sheet separator mechanisms 18 and 19 as a unit longitudinally of the feeder to accommodate sheets of different lengths.

Extending transversely of the feeder through the housings 20 and a center bracket 24 (FIG. 1) and journalled in suitable bearings in said housings, said bracket and the end brackets 23 is a cam shaft 25 which is driven in any suitable manner from the printing press or any other suitable source of power to make one revolution for each cycle of operation of the feeder. The center bracket 24 is engaged over the cross shafts 21 and is suitably secured to one or both of said shafts. Keyed to the cam shaft 25 and disposed within the housing 20 of each sheet separator mechanism is a cam 26 which engages a roller 27 that is journalled at 28 on the inner side of the upwardly projecting arm 29 of a bell-crank lever 30 also disposed within said housing and having a forwardly projecting arm 31. For a purpose to appear hereinafter, this bell-crank lever 30 is pivotally mounted on a short sleeve or hollow stub shaft 32 instead of the solid stud shown in the above mentioned Patent No. 2,389,480, said sleeve or stub shaft projecting into the housing 20 to receive said bell-crank lever and being secured in any suitable manner to said housing. The roller 27 is continuously biased toward the cam 26 by a coil extension spring 33 having one end thereof connected to a pin 34 which is located at the outer side of the bell-crank lever 30 and is suitably secured in the arm 29 of said lever. The opposite end of the spring 33 is connected to a pin 35 which is suitably secured in a cover plate 36 and projects therefrom into the housing 20 to receive said spring. For purposes to appear hereinafter, the pins 34 and 35 are made slightly longer than the corresponding pins shown in the above-mentioned Patent No. 2,389,480. The cover plate 36 is removably secured to the housing 20 at the inner open side thereof and is provided with an annular clearance opening 37 (FIGS. 5 and 6) which is located coaxially with the sleeve 32 and is of a diameter at least that of the inner diameter of said sleeve, for a purpose to appear hereinafter.

Pivotally connected at 38 (FIGS. 2 and 4) to the free end of the bell-crank arm 31 and disposed at opposite sides of said arm are the lower ends of vertical links 39 the upper ends of which are pivotally connected at 40 to and at opposite sides of a block 41. This block 41 is brazed or otherwise suitably secured to and adjacent the lower end of a guide rod 42 (FIGS. 2, 4 and 5) which is inclined upwardly and forwardly at a slight angle in the direction of feed of the sheets and is guided for vertical sliding movement in a suitable opening 43 formed in the housing 20. The guide rod 42 has mounted thereon between the block 41 and a nut 44 threaded on and pinned to said rod at the lower end thereof a bracket 45 which projects forwardly from said rod and is constructed to receive and support a suction sheet lifting device, indicated generally at 46, of known construction and including a sheet gripping rubber suction cup 47. Vacuum is created in the suction device 46 at predetermined intervals through a flexible conduit 48 which is connected with said device and with a suitable valve mechanism (not shown) that, in turn, is connected with a vacuum pump (not shown) or other suitable source of vacuum.

With the construction thus far described, the suction devices 46 of the sheet separator mechanisms 18 and 19, will be lowered in unison by the bell-crank levers 30 and the contracting action of the springs 33, and will be raised in unison by said levers and the cams 26 at predetermined intervals. The operation of the suction devices 46 is so timed that the downward movement thereof occurs while the opposite rear corner portions of the topmost sheet are being preliminarily separated from the pile by the corner air blast devices 17 as shown in FIG. 2, whereupon the suction cups 47 will, due to the creation of vacuum therein, grip the separated corner portions of said topmost sheet as shown in FIG. 4, and upon subsequent upward movement of said suction devices, said sheet will be lifted and further separated at and along the rear edge thereof, as diagrammatically shown in FIG. 3.

After the topmost sheet has been separated and lifted at and along the rear edge thereof as aforesaid, and while said sheet is still gripped by the suction devices 46, it is winded from below to completely separate the same from the next or underlying sheet. This is accomplished by sheet folding and winding foot clamp mechanisms of substantially the same construction and operation as those disclosed in the United States Patent No. 2,402,453, granted June 18, 1946, to Walter E. Schneider. These sheet holding and winding foot clamp mechanisms, indicated generally at 50 and 51 (FIG. 1), are constructed one left-hand and the other right-hand, and are arranged at the rear and opposite sides of the feeder adjacent the sheet separator mechanisms 18 and 19, respectively. Since the constructions of the mechanisms 50 and 51 are otherwise identical, a description of one will suffice for both, and for this purpose the mechanism 50 has been chosen.

Figure 3:
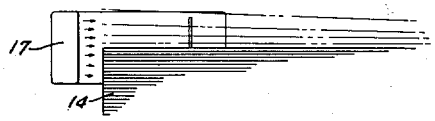
FIG. 3 is an enlarged side elevational view, partly in section, of one of the sheet holding foot clamp mechanisms shown in FIG. 1 and as viewed from the position indicated by the line 3—3 of FIG. 1, the cover plate for the housing of said mechanism being removed for purposes of clearer illustration.
Figure 3:
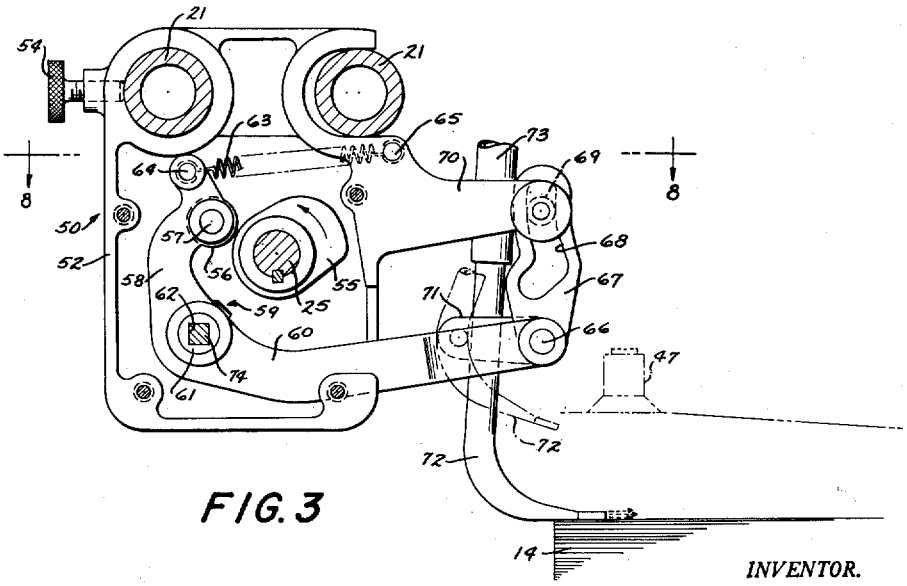
Figure 5:
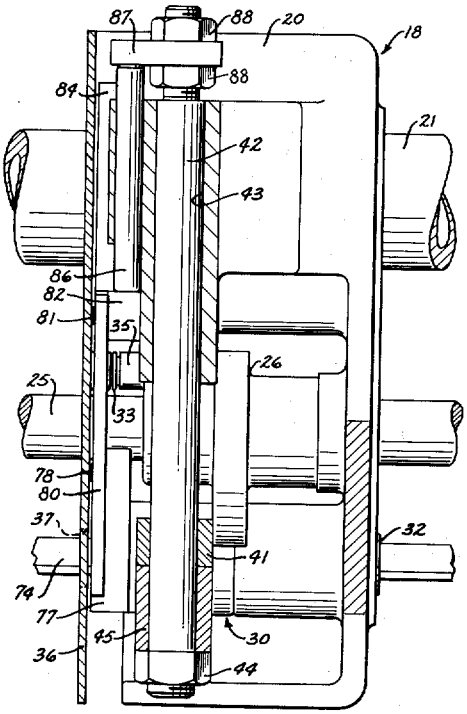
FIG. 5 is an enlarged vertical sectional view substantially on the line 5—5 of FIG. 4.
Figure 6:
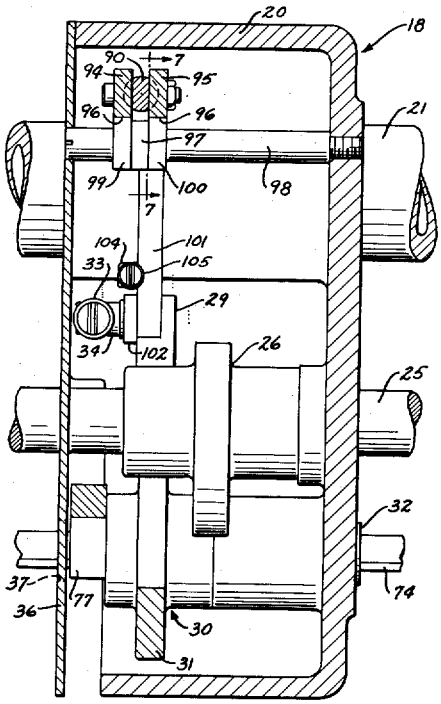
FIG. 6 is an enlarged vertical sectional view substantially on the irregular line 6—6 of FIG. 4.
Figure 8:
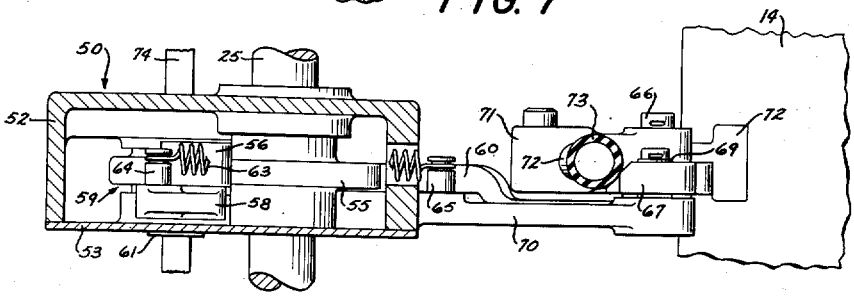
FIG. 8 is a horizontal sectional view substantially on the line 8—8 of FIG. 3, the spring having an intermediate portion thereof broken away for purposes of clearer illustration.

As herein shown in FIGS. 3 and 8, each sheet holding and winding foot clamp mechanism comprises a housing 52 and a cover plate 53 removably secured to said housing at the inner open side thereof. The housings 52 are slidably mounted on and capable of adjustment along the cross shafts 21, and each housing is secured by a clamp screw 54 to one of said shafts in various positions of adjustment thereof. The cam shaft 25 also extends through the housings 52 and is also journalled in suitable bearings in said housings.

Disposed within each housing 52 and keyed to the cam shaft 25 is a cam 55 which engages a roller 56 that is journalled at 57 on the inner side of the upwardly projecting arm 58 of a bell-crank lever 59 which is also disposed within said housing. The bell-crank lever 59 is provided with another arm 60 which projects forwardly beyond the housing 52 through a suitable clearance opening in said housing. The bell-crank lever 59 is suitably secured to a short sleeve or hollow stub shaft 61 which is journalled at opposite ends thereof in suitable bearings provided in the housing 52 and the cover plate 53, said sleeve or stub shaft being provided with a square opening 62 extending axially therethrough, for a purpose to be hereinafter described. The roller 56 is continuously biased toward the cam 55 by a coil extension spring 63 having one end thereof connected to a pin 64 which is suitably secured to and at the inner side of the bell-crank arm 58. The opposite end of the spring 63 is connected to a pin 65 which is suitably secured in the housing 52. Pivotally connected at 66 to the free forward end of the bell-crank arm 60 is an upwardly projecting cam link 67 having a closed cam groove 68 therein within which is engaged a roller 69 that is journalled on an arm 70 formed integrally with and projecting forwardly of the housing 52. Secured to or formed integrally with the cam link 67 is a rearwardly projecting arm 71 in which is adjustably clamped a downwardly and forwardly extending hollow foot clamp 72.

Through the combined actions of the bell-crank levers 59 and the cam grooves 68 in the links 67 effected by the springs 63 and the cams 55, the arms 71 are moved in unison downwardly and upwardly and at the same time are swung about the pivots 66 in counter-clockwise and clockwise directions, respectively, once during each cycle of operation of the feeder. This results first in a downward forward movement and then in an upward backward movement of the foot clamps 72. As well understood in the art, the described downward forward movement of the foot clamps 72 effected by the springs 63 is so timed that it occurs after the topmost sheet is lifted by the suction devices 46 and before said sheet is released by said suction devices and forwarded relative to the pile 14, thus resulting in engagement of said foot clamps under yielding spring pressure with the top surface of said pile beneath the lifted sheet, as shown in full lines in FIG. 3, and winding of said sheet to completely separate the same from the next or underlying sheet. Likewise, the described upward backward movement of the foot clamps 72 effected by the cams 55 is so timed that it occurs just as or immediately after the lifted topmost sheet released by the suction devices 46 is forwarded relative to the pile 14 and delivered in lapped or unlapped relation with a preceding sheet to known conveyor means (not shown) by known sheet forwarding devices (not shown) which, in the type of feeder illustrated herein, engage the rear portions of the sheets, at which time the suction devices 46 have already begun their next downward movement and are approaching the top of the pile 14. Accordingly, the underlying sheet is held by the foot clamps 72 against displacement while the lifted topmost sheet is being forwarded from the pile 14, the forwardly directed currents of air discharged from said foot clamps further act, in conjunction with the sheet forwarding devices, to forward said topmost sheet, and said underlying sheet is then released by said foot clamps for subsequent lifting by the suction devices 46. Air under pressure is delivered to the foot clamps 72 through flexible conduits 73 which are connected to said foot clamps and with a suitable valve mechanism (not shown) that is, in turn, connected with a suitable source of compressed air.

The above described pile winding, sheet lifting, sheet holding and winding, and sheet forwarding operations occur once during each cycle of operation of the feeder in timed relation with each other, whereby successive sheets are fed from the top of the pile or supply 14 during successive cycles of operation of the feeder. The forward winding of each lifted sheet may be accomplished by separate stationary blow pipes located rearwardly of the rear vertical projection of the pile 14, in which case the foot clamps 72 will act only as foot clamps and may be made solid as desired. Additionally, the successive sheets may be forwarded from the pile 14 by known sheet forwarding devices which are arranged to engage the front portions of the sheets, as well understood in the art. It is important to note that the extent of downward movement of the foot clamps 72 by the springs 63 under the control of the cams 55 progressively increases as the sheets are fed from the top of the pile 14 and the height of said pile accordingly decreases, and decreases as the top of the pile is restored to its normal feeding level through operation of the pile elevator and raising of said pile thereby.

In accordance with the present invention, each time that the suction devices 46 are moved downwardly toward the top of the pile of sheets 14 by the springs 33 during the normal operation of the feeder, the extent of such downward movement of each suction device is independently controlled so that said suction devices will be stopped independently of each other when the respective suction cups 47 thereof reach the opposite corner portions of the topmost sheet at or substantially at the separated levels of said corner portions and before said suction cups can depress the separated corner portions back onto the pile. In this manner, lifting of the topmost sheet alone and only single sheets by the suction devices 46 is positively assured. This stopping of the suction devices 46 is, in accordance with the present invention, accomplished automatically and accurately under the control of the independent foot clamps 72 which, for this purpose, advantageously and effectively act as pile or supply height testing members or feelers through the described periodic engagement thereof with the top of the pile or supply of sheets 14, and effect independent operation of novel control means which are illustrated herein, by way of example, in a form particularly adapted for embodiment not only in new sheet feeders of the specific type described, but also in sheet feeders of this type now in the field having sheet separator mechanisms and sheet holding foot clamp mechanisms of the specific construction illustrated herein and hereinbefore described. The present invention also comprehends the use thereof in other types of sheet feeders having a suction or other type of sheet separating device operable periodically toward and away from the supply of sheets.

Except that the control means for the sheet separator mechanisms 18 and 19 are constructed one left-hand and the other right-hand, said control means are identical and a description of one will, therefore, suffice for both, the one embodied in the sheet separator mechanism 18 and operated and controlled by the foot clamp mechanism 50 being chosen for this purpose. As herein shown, each separator control means comprises the following elements constructed, mounted, operated and controlled as follows.

Extending transversely through the square opening 62 in the pivot sleeve 61, the annular clearance opening 37 in the cover plate 36 on the housing 20, and the annular clearance opening in the fixed sleeve 32 in said housing is a square bar 74 having reduced annular end portions 75 (FIG. 1) forming journals which are rotatably engaged in suitable bearings formed in the center bracket 24 and in a bracket 76 that is bolted or otherwise suitably secured to the adjacent end bracket 23. The bar 74, through engagement thereof in the corresponding square opening 62 in the sleeve 61, will thus be rocked by said sleeve in opposite directions each time that the bell-crank lever 59 secured to said sleeve is lowered by the spring 63 and raised by the cam 55 to move the foot clamp 72 into and out of engagement with the top of the pile of sheets 14. Disposed within the separator housing 20 is an arm 77 (FIGS. 2, 4, 5 and 6) which is broached at one end thereof and engaged over the bar 74 for rocking movement thereby, said arm being located between the bell-crank lever 30 and the cover plate 36. The arm 77 projects forwardly from the bar 74 and is provided at the forward free end thereof with an outwardly and laterally projecting pin 78 which is engaged in an elongated lost-motion slot 79 formed in the lower end portion of a vertical link 80 also disposed within the separator housing 20. The upper end of this link 80 is pivotally connected at 81 to the free forward end of the forwardly projecting arm 82 of a bell-crank lever 83 also disposed within the housing 20 and having an upwardly projecting arm 84. The bell-crank lever 83 is pivotally mounted on a stud 85 which is suitably secured to and projects into the housing 20. The forward end of the bell-crank arm 82 is arranged to engage and to be engaged by the lower end of a stop pin 86 which is mouned for free sliding vertical movement in the housing 20 and is located close to and at one side of the guide rod 42 for the suction device 46. The stop pin 86 continuously projects at its upper end beyond the upper surface of the housing 20 so that upon downward movement of the guide rod 42, said stop pin will be engaged by a stop plate 87 which is loosely engaged over the reduced upper end of said guide rod and is held in adjusted positions and against rotation relative to the guide rod by lock nuts 88 threaded on said guide rod and disposed above and below said stop plate.

Pivotally connected at 89 (FIG. 2) to the free upper end of the bell-crank arm 84 is the forward end of a horizontal spring-pressed rod 90 (FIGS. 2, 4 and 6) which projects rearwardly from said arm and outwardly beyond the housing 20 through a suitable clearance opening formed in the rear wall of said housing. The spring 91 for the rod 90 is of the coil compression type and surrounds the outwardly projecting end of said rod, the outer end of said spring engaging against a washer 92 engaged over the rod and retained thereon by a nut 93, and the inner end of said spring engaging against the housing 20 in a suitable socket formed in said housing. The spring 91 thus tends at all times to move the rod 90 rearwardly, thereby rocking the bell-crank lever 83 about its pivot 85 in a counter-clockwise direction, as viewed in FIG. 2, until the arm 82 of said lever contacts the housing 20 and the stop pin 86 is projected by said arm relative to said housing its maximum extent, as shown in broken lines in FIG. 2. These are the positions occupied by the bell-crank lever 83 and the stop pin 86 when the suction device 46 is in its raised uppermost position, shown in FIG. 2, determined through engagement of the high part of the cam 26 with the roller 27, and when the foot clamp 72 is also in its raised uppermost position, shown in broken lines in FIG. 3, determined through engagement of the high part of the cam 55 with the roller 56. At this time, the link 80 and the arm 77 will also occupy the relative broken line positions thereof shown in FIG. 2 wherein it will be noted that the pin 78 in said arm is spaced from the lower end of the slot 79 in said link a predetermined distance which is always less than that which exists between the raised foot clamp 72 and the top of the pile of sheets 14 during the normal operation of the feeder.

Accordingly, when the foot clamp 72 is lowered from its normal raised position shown in broken lines in FIG. 3, toward and into engagement with the top of the pile of sheets 14 at whatever level it may occupy during the normal operation of the feeder, the pin 78 on the arm 77, through downward pivotal movement of said arm simultaneously with the foot clamp 72, will first move idly downwardly along the slot 79 in the link 80, and then upon continued downward movement of said arm with said foot clamp, said pin will engage the lower end of said slot and move said link downwardly, as shown in full lines in FIG. 2, a distance commensurate with the extent of downward movement of the foot clamp until the latter engages and is stopped by the top of the pile of sheets 14, as shown in full lines in FIG. 3. Under these conditions, the bell-crank lever 83 will be rocked by the link 80 in a clockwise direction, as viewed in FIG. 2, against the opposition of the spring 91, resulting in downward movement of the arm 82 of said lever, as shown in full lines in FIG. 2, a distance at the free end thereof substantially equal to the extent of downward movement of said link. The stop pin 86 being thus released by the bell-crank arm 82 will immediately drop by gravity relative to the housing 20 and will be vertically positioned by said arm such that the stop plate 87 on the guide rod 42, upon subsequent downward movement of the suction device 46, will engage the upper end of said stop pin, as shown in FIG. 4, before the suction cup 47 reaches the level of the top of the pile of sheets 14. The described elements of the control means are so proportioned that engagement of the stop plate 87 with the stop pin 86 will, as shown in FIG. 4, occur substantially when the suction cup 47 reaches the higher level of the separated corner portion of the top sheet to be gripped and lifted thereby.

If, for any reason, the stop pin 86 fails to drop and follow the bell-crank arm 82 when the bell-crank lever 83 is operated by the link 80 as above described, the stop plate 87 will so move said stop pin upon engagement therewith and continued downward movement of the guide rod 42 until said pin is stopped by said arm.

In FIG. 2 of the drawings, the arm 77, link 80, bell-crank lever 83, rod 90, and stop pin 86 are shown in the relative full line positions they would substantially occupy when the top of the pile of sheets 14 is substantially at the mean feeding level thereof and is engaged at said level by the foot clamp 72. Accordingly, when the top of the pile of sheets 14 is at a higher feeding level, the stop pin 86 will occupy a correspondingly higher position under the control of the bell-crank lever 83, and when the top of said pile is at a still lower feeding level, said stop pin will occupy a correspondingly lower position under the control of said bell-crank lever, resulting in the former case in decreased downward movement of the suction device 46, and in the latter case in increased downward movement of said suction device. It will thus be apparent that by virtue of the described control means, each time that the suction device 46 is lowered toward the top of the pile of sheets 14, it will be stopped automatically with the suction cup 47 thereof spaced upwardly from the top of said pile a predetermined distance, as shown in FIG. 4, and said distance will be substantially maintained at whatever level the top of the pile may occupy during the normal operation of the feeder. This distance is accurately obtained and may be varied as desired or required to suit different stocks and stock conditions by simply loosening the lock-nuts 88 and adjusting the stop plate 87 upwardly or downwardly relative to the guide rod 42 by said nuts and again tightening the latter.

With the construction thus far described, it might be said that when the stop pin 86 is engaged by the downwardly moving stop plate 87, said stop pin and the bell-crank lever 83 will yield downwardly in opposition to the spring 91 under the downward pressure imposed thereon by the sucker operating spring 33 and the weight of the suction device 46 and the described parts for supporting the same. Hence, the suction device 46 would not be stopped in a definite position with respect to the top of the pile of sheets 14. Likewise, when the foot clamp 72 is raised from the pile of sheets 14 shortly after the suction device 46 begins its next downward movement as hereinbefore described, the bell-crank lever 83 will be immediately returned to its original position under the action of the spring 91 and thus prematurely raise the stop pin 86 to its original projected position. Hence, the suction device 46 will be prevented by the stop pin 86 from continuing downwardly an extent sufficient to bring the suction cup 47 thereof to sheet gripping position. Accordingly, latch means is provided for locking the bell-crank lever 83 in its actuated operative position and against pivotal movement in either direction until the suction device 46 has been moved downwardly to sheet gripping position and has gripped and lifted the topmost sheet from the pile, as hereinbefore described, said latch means being effective without interfering with the upward movement of the foot clamp 72 out of engagement with the pile and the downward movement of the suction device 46 toward said pile.

Figure 7:
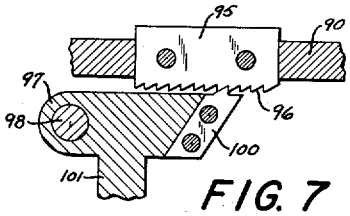
FIG. 7 is a vertical sectional view on the line 7—7 of FIG. 6.

As herein shown, said latch means is controlled by and through operation of the suction device 46, and comprises two plates 94 and 95 (FIGS. 2, 4, 6 and 7) which are secured in any suitable manner to the rod 90 at opposite sides of said rod and are provided along the lower edges thereof with relatively fine ratchet-like teeth 96. In the mounting of the plates 94 and 95 on the rod 90, one of said plates, i.e., the plate 95, is turned facewise 180° so that the teeth 96 thereon are reversed with respect to the teeth 96 on the other of said plates, i.e., the plate 94, as will be seen by a comparison of FIGS. 2 and 7. Disposed within the housing 20 and located directly below the rod 90 is a pawl carrier 97 which is pivotally mounted on a pin 98 that is suitably secured at one end thereof to said housing and is supported at the other end thereof in and by the cover plate 36. Secured in any suitable manner to the pawl carrier 97 at opposite sides thereof are two pawls 99 and 100. The pawl 100 is constructed and arranged to engage the teeth 96 of the latch plate 95 and thereby lock the rod 90 in its actuated forward position and the bell-crank lever 83 in its actuated downward position and oppose return movement of said rod, said bell-crank lever, and the stop pin 86 to their original positions by the action of the spring 91. The pawl 99 is constructed and arranged to simultaneously engage the teeth 96 of the latch plate 94 and thereby oppose yielding movement of the rod 90, the bell-crank lever 83 and the stop pin 86 beyond their actuated positions by the pressure of the stop plate 87 on said pin.

The pawl carrier 97 has secured thereto or formed integrally therewith an arm 101 (FIGS. 2, 4 and 6) which extends downwardly and is pivotally connected at the lower free end thereof with the free forward end of a horizontal link 102. This link 102 extends rearwardly from the pawl carrier arm 101 and is provided with an elongated lost-motion slot 103 within which is engaged the pin 34 on the arm 29 of the spring and cam operated bell-crank lever 30 which lowers and raises the suction device 46. The arm 101 of the pawl carrier 97 has connected thereto at 104 one end of a coil extension spring 105, the opposite end of which is connected to the pin 35 on the cover plate 36 of the separator housing 20. The spring 105 thus serves to continuously urge the pawl carrier 97 upwardly toward the rod 90, and the link 102 forwardly relative to the bell-crank lever 30.

When the rod 90 is in its fully retracted inoperative position determined through engagement of the bell-crank lever 83 with the housing 20, as shown in broken lines in FIG. 2, the latch plates 94 and 95 are so located on said rod that the aligned front edges thereof are substantially in vertical alignment with the pawls 99 and 100 or slightly forward of said pawls. When the suction device 46 is in its raised uppermost position, shown in FIG. 2, effected through engagement of the high part of the cam 26 with the roller 27 on the bell-crank lever 30, the pin 34 on said lever is engaged with the rear end of the slot 103 in the link 102, whereupon said link is drawn rearwardly by said pin, as shown in FIG. 2, the pawl carrier 97 is rocked downwardly about its pivot 98 by the link, and the pawls 99 and 100 on said pawl carrier are disengaged from the teeth 96 on the latch plates 94 and 95, respectively, thus releasing the rod 90 and providing for downward pivotal movement of the bell-crank lever 83 by the link 80, and positioning of the stop pin 86 by said lever upon downward movement of the foot clamp 72, as hereinbefore described.

It will thus be apparent that when the foot clamp 72 is moved downwardly into engagement with the top of the pile of sheets 14, resulting in forward movement of the rod 90 an extent depending on the elevational position of the top of said pile, as hereinbefore described, the latch plates 94 and 95 will move with said rod in the same direction and the same extent. At no time during the normal operation of the feeder will the extent of forward movement of the rod 90 exceed the length of the latch plates 94 and 95. It will also be apparent that when the suction device 46 is, as hereinbefore described, lowered toward the top of the pile of sheets 14 subsequent to the downward movement of the bell-crank lever 83 by the foot clamp 72 and the positioning of the stop pin 86 by said lever, the pin 34 on the bell-crank lever 30, through downward pivotal movement of said latter lever, will immediately move away from the rear end of the slot 103 in the link 102 and thus release said link, whereupon the pawl carrier 97 will be immediately rocked upwardly by the contracting action of the spring 105 until the pawls 99 and 100 engage the teeth 96 of the latch plates 94 and 95, respectively. The bell-crank lever 83, upon engagement of the pawls 99 and 100 with the respective latch plates 94 and 95, will thus be locked in its actuated operative position and held against pivotal movement in either direction, and stopping of the suction device 46 by the stop pin 86 in a definite position with respect to the top of the pile of sheets 14 is thus assured.

It is pointed out that upon engagement of the pawls 99 and 100 with their respective latch plates 94 and 95 which occurs immediately after the suction device 46 begins its downward movement by the bell-crank lever 30, the excess length of the slot 103 in the link 102 allows for continued downward movement of said lever and said suction device without interference, as shown in FIG. 4, until stopped by the stop pin 86 with the suction cup 47 in sheet gripping position. It is also pointed out that as soon as the bell-crank lever 83 is locked in its actuated operative position through engagement of the pawls 99 and 100 with the latch plates 94 and 95, respectively, as above described, the foot clamp 72 may be raised by the cam 55 out of engagement with the pile of sheets 14 without affecting the positions of said lever, the link 80 and the stop pin 86, such upward movement of the foot clamp being permitted, as shown in FIG. 4, by reason of the excess length of the slot 79 in said link.

It will further be apparent that the pawls 99 and 100 will remain in engagement with their respective plates 94 and 95 until the suction device 46 has gripped the topmost sheet at the separated corner portion thereof and has again moved upwardly with said sheet, whereupon the pin 34 on the bell-crank lever 30 will again engage the rear end of the slot 103 in the forwardly actuated link 102 and through such engagement and continued upward pivotal movement of said lever its maximum extent by the cam 26, move said ink rearwardly and thus rock the pawl carrier 97 downwardly and disengage said pawls from said latch plates. Thereupon, the rod 90, the bell-crank lever 83, the link 80 and the stop pin 86 are returned to their original positions, shown in broken lines in FIG. 2, by the expanding action of the spring 91, in readiness for repeat operation thereof by the foot clamp 72 upon subsequent downward movement thereof into engagement with the top of the pile of sheets 14.

It will be noted that since, in the illustrated embodiment, the described pile winding, sheet lifting, and sheet winding and holding operations are performed in the order named once during each cycle of operation of the feeder, the stop pin 86 is positioned, as described, by the foot clamp 72 when the latter is moved downwardly toward the pile of sheets 14 and into holding engegement with the next or succeeding sheet beneath the previously lifted sheet and, hence, said stop pin as so positioned functions to stop the suction device 46 upon the next downward movement thereof to grip and lift said next or succeeding sheet. In other words, the stop pin 86 is positioned during a preceding cycle of operation of the feeder to function and stop the suction device 46 upon operation thereof during the next or succeeding cycle of operation of the feeder.

The operation of the sheet separator mechanisms and the sheet holding foot clamp mechanisms embodying the present invention will be clearly understood from the foregoing description, and while the description and the accompanying drawings set forth with more or less particularity one embodiment of the invention, it is to be expressly understood that said invention is not limited to said embodiment, or to the use thereof with the specific type of mechanisms disclosed herein. Various changes may be made in the mechanical details to adapt the control means for use in other sheet feeders, and in the design and arrangement of the parts illustrated without departing from the spirit and scope of the invention, as will now be clear to those skilled in the art. For example, the dual latch plates 94 and 95 with the fine ratchet-like teeth 96 thereon provide for a very fine adjustment of the positions of the suction devices 46 with respect to the top of the pile of sheets 14, but if such adjustment is not deemed necessary or desirable, a gear-tooth type of rack secured to or formed integrally with the rod 90, and a single gear-tooth type of pawl or detent may be used in lieu of said latch plates and the companion pawls 99 and 100. Additionally, a timed feeler separate from the foot clamp and having no sheet holding function may be used. Also, in some instances, particularly when the feeler element may remain in contact with the pile or supply of sheets during the lifting of the topmost sheet, the elongated slot 79 in the link 80 may be eliminated and the arm 77 connected directly to said link. For a definition of the limits of the invention, reference is had primarily to the appended claims.

What is claimed is:

1. In a sheet feeder, a sheet separating mechanism comprising a [housing] *support* fixed against vertical up and down movement, a cam shaft journalled in said [housing] *support*, a sheet separating device pivotally mounted on said [housing] *support* and operable from a position spaced from a supply of sheets toward the latter to grip the first sheet of said sheet supply and move at least a portion of said sheet facewise away from said sheet supply to said position, means including a cam fixed on said shaft for operating said sheet separating device, and means on said [housing] *support* and controlled by said sheet supply and actuated variably in accordance with the location of said sheet supply from said sheet separating device in said position for controlling and determining the extent of movement of said sheet separating device toward said sheet supply, *said last-named means comprising holding means rendered operative in response to the initial movement of said sheet separating device toward said sheet supply and releasable in response to the final movement of said sheet separating device away from said sheet supply.*

2. In apparatus of the class described, a suction device arranged above a supply of sheets and movable downwardly toward and upwardly away from said sheet supply to grip the topmost sheet and lift at least a portion of said sheet from said sheet supply, mechanism for periodically moving said suction device downwardly and upwardly, means for determining the location of the top of said sheet supply, [and] stop means operable under the control of said last-named means to different positions in accordance with the location of the top of said sheet supply for limiting the downward movement of said suction device by said mechanism, *and holding means responsive to movements of said suction device for holding said stop means against movement during appreciable portions of the final downward and initial upward movements of said suction device.*

3. Apparatus as defined in claim 2 wherein said stop means functions in said positions to stop said suction device in a position spaced upwardly a predetermined distance from the top of said sheet supply.

4. In a sheet feeder, a suction device, means for periodically moving said suction device downwardly toward and upwardly away from a supply of sheets to grip the topmost sheet of said sheet supply and lift at least a portion of said sheet from said sheet supply, a feeler element, means for periodically moving said feeler element downwardly into engagement with the top of said sheet supply in timed relation with the downward movement of said suction device, [and] means actuated variably in accordance with the extent of downward movement of said feeler element for controlling and determining the extent of downward movement of said suction device, *and means responsive to movements of said suction device for holding said last-named means against movement during a substantial portion of the downward and upward movements of said suction device.*

5. In a sheet feeder, a suction device arranged above a supply of sheets and mounted for movement toward and away from said sheet supply to grip the topmost sheet of said sheet supply and lift at least a portion of said sheet from said sheet supply, mechanism for periodically operating said suction device toward and away from said sheet supply, a feeler element arranged above said sheet supply, mechanism for periodically operating said feeler element toward and away from said sheet supply into and out of engagement, respectively, with the top of said sheet supply in timed relation with the operation of said suction device, [and] stop means operable in response to the movement of said feeler element toward said sheet supply and positioned in accordance with the extent of such movement for limiting the movement of said suction device by said first-named mechanism toward said sheet supply to a predetermined position with respect to the top of said sheet supply, *means for releasably holding said stop means in the actuated position thereof, and means comprising a lost-motion connection operably connecting said first-named mechanism and said holding means for controlling the holding and releasing functions of the later.*

[6. A sheet feeder as defined in claim 5, comprising means for releasably holding said stop means in the actuated position thereof.]

[7. A sheet feeder as defined in claim 5, comprising means for releasably locking said stop means in the actuated position thereof and against movement in either direction from said position.]

8. [A] *In a* sheet feeder [as defined in claim 5, comprising], *a suction device arranged above a supply of sheets and mounted for movement toward and away*

*from said sheet supply to grip the topmost sheet of said sheet supply and lift at least a portion of said sheet from said sheet supply, mechanism for periodically operating said suction device toward and away from said sheet supply, a feeler element arranged above said sheet supply, mechanism for periodically operating said feeler element toward and away from said sheet supply into and out of engagement, respectively, with the top of said sheet supply in timed relation with the operation of said suction device, stop means operable in response to the movement of said feeler element toward said sheet supply and positioned in accordance with the extent of such movement for limiting the movement of said suction device by said first-named mechanism toward said sheet supply to a predetermined position with respect to the top of said sheet supply, and* operable latch means [responsive] *rendered operable in response* to the *initial* movement of said suction device toward said sheet supply for releasably holding said stop means in the actuated position thereof.

[9. A sheet feeder as defined in claim 5, comprising latch means operable in response to the movement of said suction device toward said sheet supply for holding said stop means in the actuated position thereof and against movement in either direction from said position and operable in response to the movement of said suction device away from said sheet supply to release said stop means.]

10. In apparatus of the class described, a suction device, mechanism for periodically moving said suction device downwardly toward and upwardly away from a supply of sheets to grip the topmost sheet of said sheet supply and lift at least a portion of said sheet from said sheet supply, a movably mounted stop member arranged to be engaged by a part of said mechanism during downward movement of said suction device thereby for limiting such movement of said suction device, a feeler element operable from a fixed position spaced upwardly from said sheet supply toward and into engagement with the top of said sheet supply, mechanism operable periodically in timed relation with the operation of said suction device for moving said feeler element into engagement with said sheet supply prior to the downward movement of said suction device, [and] means operatively connected with said last-named mechanism for effecting movement of said stop member concurrently with the downward movement of said feeler element and for positioning said stop member in accordance with the extent of such downward movement of said feeler element to bring the latter into engagement with said sheet supply, *and means responsive to a portion of the initial downward movement of said suction device for rendering said last-named means incapable of moving said stop member during the further downward movement of said suction device.*

11. In apparatus of the class described, a suction device, mechanism for periodically moving said suction device downwardly toward and upwardly away from a supply of sheets to grip the topmost sheet of said sheet supply and lift at least a portion of said sheet from said sheet supply, a movably mounted stop member arranged to be engaged by a part of said mechanism during downward movement of said suction device thereby for arresting the operation of said mechanism and thereby limiting such movement of said suction device, a pivotal arm associated with said stop member and operable to control the movement of said stop member to different operative positions, a feeler element mounted for movement toward and into engagement with the top of said sheet supply, mechanism operable periodically in timed relation with the operation of said suction device for moving said feeler element into engagement with the top of said sheet supply prior to the downward movement of said suction device, [and] means actuated by said last-named mechanism and operatively connected with said arm for operating the latter concurrently with the movement of said feeler element toward said sheet supply and for imparting movement to said arm of an extent commensurate with the extent of movement of said feeler element to bring the latter into engagement with said sheet supply, *and means for releasably locking said arm against movement in its actuated position, said locking means being releasable in response to the final upward movement of said suction device.*

12. In apparatus of the class described, a suction device, mechanism for periodically moving said suction device downwardly toward and upwardly away from a supply of sheets to grip the topmost sheet of said sheet supply and lift at least a portion of said sheet from said sheet supply, a movably mounted stop member arranged to be engaged by a part of said mechanism during downward movement of said suction device thereby for arresting the operation of said mechanism and thereby limiting such movement of said suction device, a pivotal arm associated with said stop member and operable to control the movement of said stop member to different operative positions, an operable feeler element arranged above said sheet supply and normally spaced therefrom, mechanism operable periodically in timed relation with the operation of said suction device for moving said feeler element downwardly toward and into engagement with the top of said sheet supply and upwardly away from and out of engagement with said sheet supply, said downward movement and engagement of said feeler element with said sheet supply occurring prior to the downward movement of said suction device, means including a lost-motion connection between said last-named mechanism and said arm for operating the latter concurrently with the downward movement of said feeler element and for imparting movement to said arm of an extent commensurate with the extent of such movement of said feeler element to bring the latter into engagement with said sheet supply, said lost-motion connection allowing for operation of said last-named mechanism and upward movement of said feeler element independently of said arm, [and] latch means operable prior to the upward movement of said feeler element for releasably holding said arm in its actuated operative position, *and means for moving said latch means to latched position during an initial portion of the downward movement of said suction device, whereby said latch means is operative during the remainder of said downward movement of the suction device.*

[13. Apparatus as defined in claim 12 wherein the operation of said latch means is responsive to the downward movement of said suction device.]

14. Apparatus as defined in claim 12, comprising resilient means operably connected to said arm and tending at all times to move said arm in a direction opposite to the direction imparted thereto by said last-named mechanism.

15. Apparatus as defined in claim 14 wherein the operation of the latch means to hold the arm in its actuated operative position and to release said arm for movement by said resilient means is responsive to *an initial portion of* the downward and *a final portion of the* upward movements, respectively, of the suction device.

16. In apparatus of the class described, a suction device, mechanism for periodically moving said suction device downwardly toward and upwardly away from a supply of sheets to grip the topmost sheet of said sheet supply and lift at least a portion of said sheet from said sheet supply, a gravity biased stop member mounted for sliding up and down movements and arranged to be engaged by a part of said mechanism during downward movement of said suction device thereby for limiting such movement of said suction device, a pivotal arm arranged to engage and to be engaged by said stop member and operable downwardly to enable downward movement of said stop member to different operative positions under the control of said arm, a spring-pressed rod operably connected to said arm and tending at all times to impart upward movement to said arm and consequently said stop member, an operable feeler element arranged above said sheet supply and normally spaced therefrom, mechanism operable periodically in timed relation with the operation of said suction device for moving said feeler element downwardly toward and into engagement with the top of said sheet supply and upwardly away from and out of engagement with said sheet supply, said downward movement and engagement of said feeler element with said sheet supply occurring prior to the downward movement of said suction device, means including a lost-motion connection between said last-named mechanism and said arm for operating the latter concurrently with the downward movement of said feeler element and for imparting downward movement to said arm of an extent commensurate with the extent of such movement of said feeler element to bring the latter into engagement with said sheet supply, said lost-motion connection allowing for operation of said last-named mechanism and upward movement of said feeler element independently of said arm, and latch means operable prior to the upward movement of said feeler element for releasably holding said arm in its actuated operative position.

17. Apparatus as defined in claim 16 wherein the operation of said latch means to hold said arm in its downwardly actuated operative position and to release said arm for upward return movement by said rod is responsive to the downward and upward movements, respectively, of said suction device, and said latch means comprises two plates secured to said rod and provided along corresponding edges thereof with ratchet-like teeth, the teeth of one of said plates facing in one direction and the teeth of the other of said plates facing in the opposite direction, a pivotal pawl carrier, pawls on said carrier and arranged to engage the teeth of said plates, a spring operably connected to said carrier and tending at all times to move said carrier and thus engage said pawls with said plates, and a lost-motion connection between said carrier and said first-named mechanism providing for operation of said carrier in one direction by said spring upon downward movement of said suction device and in the opposite direction by said mechanism upon upward movement of said suction deviec.

[18. In a sheet feeder, a pair of suction devices arranged above a supply of sheets and mounted for movement independently of each other toward and away from said sheet supply to grip the topmost sheet at transversely spaced points and lift said sheet from said sheet supply, independent mechanisms for moving said suction devices in unison toward and away from said sheet supply, and means controlled by said sheet supply and actuated variably in accordance with the location of the top of said sheet supply for controlling and determining the extent of movement of said suction devices toward said sheet supply independently of each other.]

[19. In a sheet feeder, a pair of suction devices arranged above a supply of sheets and mounted for movement independently of each other downwardly toward and upwardly away from said sheet supply to grip the topmost sheet at transversely spaced points and lift said sheet from said sheet supply, independent mechanisms for periodically moving said suction devices in unison toward and away from said sheet supply, said mechanisms providing for movement of said suction devices into engagement with the top of said sheet supply, a pair of foot clamps arranged above said sheet supply and adjacent said suction devices, independent mechanisms operable periodically in timed relation with the operation of said suction devices for moving said foot clamps in unison downwardly toward and upwardly away from said sheet supply into and out of engagement, respectively, with the top of said sheet supply, and independent stop means for said suction devices operable independently and variably under the control of said foot clamps through downward movement thereof into engagement with said sheet supply for limiting the downward movement of said suction devices each to a position spaced upwardly from the top of said sheet supply.]

20. In apparatus of the class described, a suction device, mechanism for periodically moving said suction device downwardly toward and upwardly away from a supply of sheets to grip the topmost sheet of said sheet supply and lift at least a portion of said sheet from said sheet supply, said mechanism including a downwardly and upwardly operable abutment adjustable downwardly and upwardly to different relative positions, a stop member arranged to be engaged by said abutment and movable to different operative positions with respect to said abutment, engagement of said abutment with said stop member occurring during downward movement of said suction device thereby limiting such movement of said suction device, a feeler element, mechanism operable periodically in timed relation with the operation of said suction device for moving said feeler element into engagement with the top of said sheet supply prior to downward movement of said suction device, [and] means under the control of said feeler element through movement thereof toward said sheet supply for variably positioning said stop member with respect to said abutment in accordance with the extent of such movement of said feeler element to bring the latter into engagement with said sheet supply, *and means for releasably locking said last-named means against movement while said feeler is in engagement with said sheet supply and before said abutment engages said stop member, said locking means being effective also after said feeler is moved out of engagement with said sheet supply.*

References Cited in the file of this patent or the original patent

UNITED STATES PATENTS 1,248,786 Bachwitz ---------- Dec. 4, 1917